US006017830A

United States Patent [19]

Brown et al.

[11] Patent Number: 6,017,830

[45] Date of Patent: Jan. 25, 2000

[54] FLEXIBLE COMPOSITE SHEATHING MATERIAL

[76] Inventors: Christopher Brown, 147 Cranfield St., New Castle, N.H. 03854; Dennis Pinelle, 1379 River Rd., Weare, N.H. 03281

[21] Appl. No.: 08/162,995

[22] Filed: Dec. 7, 1993

[51] Int. Cl.[7] .......... B32B 3/02

[52] U.S. Cl. .......... 442/43; 442/58; 442/86; 442/126; 428/141; 428/143; 428/144; 428/147; 428/172; 428/343; 428/913

[58] Field of Search .......... 428/40, 141, 143, 428/144, 147, 172, 913, 343, 245, 224, 246, 247, 254, 255; 442/43, 58, 86, 126

[56] References Cited

U.S. PATENT DOCUMENTS

| | | | |
|---|---|---|---|
| 4,039,709 | 8/1977 | Newman | 428/159 |
| 4,668,547 | 5/1987 | Brouessard | 428/40 |
| 4,852,316 | 8/1989 | Webb | 52/235 |
| 4,879,173 | 11/1989 | Randall | 428/285 |
| 5,112,405 | 5/1992 | Sanchez | 106/608 |
| 5,283,998 | 2/1994 | Jong | 52/515 |

*Primary Examiner*—Terrel Morris
*Attorney, Agent, or Firm*—McCormick, Paulding & Huber LLP

[57] ABSTRACT

The present invention provides a flexible, composite sheathing having a performance coating, which provides the sheathing with selected aesthetic and/or functional characteristics. The sheathing includes a flexible layer of reinforcing material which supports the performance coating. The performance coating includes a mixture comprising an aggregate, a filler and a binder. Both the reinforcing layer and the performance coating are flexible enough to allow the sheathing to be pre-manufactured, rolled or folded and then shipped to a remote installation site. A method for making the sheathing is also provided.

9 Claims, 1 Drawing Sheet

FLEXIBLE COMPOSITE SHEATHING MATERIAL

BACKGROUND OF THE INVENTION

The present invention relates to sheathing material and, more particularly, to a pre-manufactured flexible, composite sheathing material having a performance coating which provides the material with selected aesthetic and/or functional characteristics.

Sheathing materials which provide selected aesthetic and/or functional characteristics, such as, for example, a textured, patterned or color finish, waterproofing or chemical resistance, are often employed in the construction of new buildings and in the repair of existing structures. When affixed to a wall, ceiling or other substrate, sheathing materials of this type serve as an alternative to vinyl, aluminum and wood siding, plywood, authentic stucco finishes, brick, concrete and concrete masonry.

Typically, such sheathing materials are both processed and applied in the field. First, a layer of adhesive is applied to the substrate. Second, a coarse mesh fiber glass or other suitable mesh fabric is troweled into the adhesive so that the adhesive penetrates through the mesh. The adhesive is then allowed to harden to form a base coat. Lastly, a surface coating is applied over the base coat to provide the substrate with the desired finish and/or required functional characteristics.

These processing and application procedures are both labor intensive and time consuming. Thus, sheathing materials of this type are relatively expensive as compared to other types of substrate finishes, such as vinyl or aluminum siding.

Accordingly, it is a general object of the present invention to provide a sheathing material having desired aesthetic and/or functional characteristics which can be pre-manufactured, shipped to an installation site and then applied in a one-step process to a wall, ceiling or other substrate.

It is another object of the present invention to provide such a sheathing material which is sufficiently flexible to be rolled or folded without damage.

It is still a further object of the present invention to provide such a sheathing material wherein selected aesthetic and/or functional characteristics are provided by specialized layers applied to the material.

It is still a further object of the present invention to provide a method for manufacturing the sheathing material.

SUMMARY OF THE INVENTION

The invention meets these and other objects by providing a flexible, composite sheathing material having a performance coating which provides selected aesthetic and/or functional characteristics. The sheathing includes a layer of flexible reinforcing material, such as, for example, a woven or non-woven fabric mesh. The performance coating is supported on one surface of the reinforcing layer. The performance coating comprises a matrix which includes a mixture of an aggregate, a filler and a binder. The aggregate incorporated into the matrix provides the sheathing material with a textured appearance. Depending on the size, type and quantity of aggregate selected and the manner in which the performance coating is processed, the sheathing material can be pre-manufactured to provide a broad range of aesthetic finishes including, for example, a simulated stucco, stone or brick-like finish.

In addition to finish, the performance coating may be formulated to provide the sheathing with additional aesthetic characteristics and/or selected functional characteristics. For example, pigments may be added to the matrix to provide the sheathing with a desired color. As to the functional characteristics of the sheathing, appropriate compounds may be incorporated into the matrix to, for example, render the sheathing waterproof or provide the sheathing with chemical resistance.

Alternatively, the performance coating may include at least one additional layer applied over the matrix to provide the sheathing material with such characteristics. Such a layer can be applied at the location where the sheathing material is manufactured or in the field.

Both the performance coating and the reinforcing layer must be flexible enough to allow the pre-manufactured sheathing to be rolled or folded for shipment. In this regard, the aggregate/binder matrix provides a distinct advantage since the matrix is flexible enough to completely maintain its integrity even when the sheathing material is handled in this manner.

If the sheathing material is to be self-adhering, then the material further comprises a layer of adhesive applied to the surface of the reinforcing layer opposite that supporting the performance coating. However, this is not an essential part of the invention, since the adhesive may be applied directly to the substrate and the sheathing adhered thereto.

Another aspect of the present invention relates to a method of producing the sheathing material. According to the method, a layer of flexible reinforcing material is provided. A matrix is then formed by mixing an aggregate and a binder, and the matrix is applied to one surface of the reinforcing layer to form a performance coating supported by the reinforcing layer.

The method may include the additional step of adding appropriate compounds to the matrix to provide the sheathing material with additional aesthetic characteristics and/or selected functional characteristics. Alternatively, the sheathing material may include such compounds as at least one separate layer applied to the performance coating. As noted above, a layer of this type may be applied at the location where the sheathing material is manufactured or in the field.

In one preferred embodiment of the invention, the method further includes the step of applying an adhesive coating to the surface of the reinforcing layer opposite to that supporting the performance coating to adhere the sheathing to a structural substrate.

DETAILED DESCRIPTION OF THE INVENTION

Figure 2:
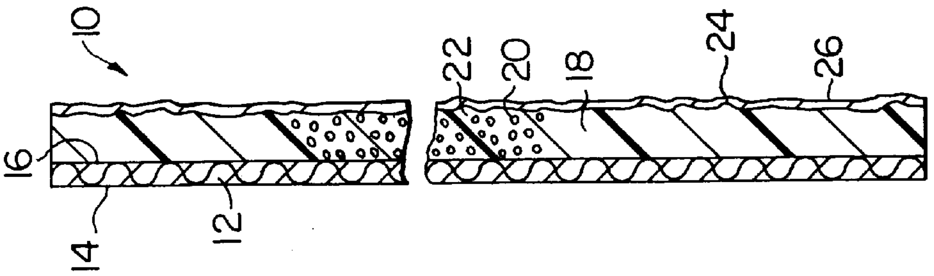
FIG. 2 is a cross-section taken along the line 2—2 of FIG. 1.
Figure 1:
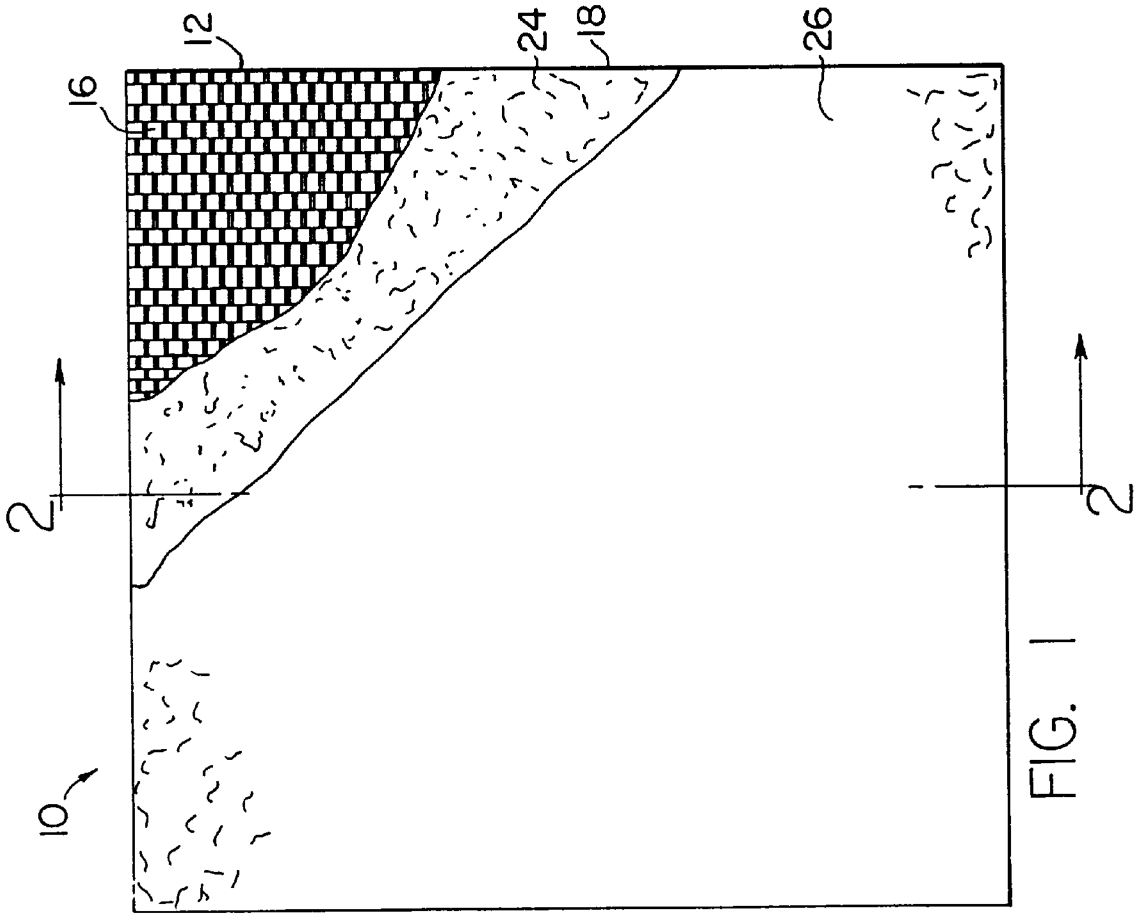
FIG. 1 is cut-away plan view of the sheathing taught by the invention.

FIGS. 1 and 2 illustrate a flexible, composite sheathing material made according to the invention. The sheathing material 10 includes a reinforcing layer 12 of flexible reinforcing material which defines an inner surface 14 and a support surface 16. A performance coating 18 is applied to the support surface of the reinforcing layer. The performance coating includes a matrix comprising a mixture of an aggregate 20, a filler and a binder 22, and the coating 18 defines an exposed surface 24. In the illustrated embodiment, an exterior layer 26 is applied to the exposed surface of the performance coating to provide the sheathing with both color and waterproofing qualities.

The reinforcing layer 12 comprises any suitable flexible reinforcing material and may be provided, for example, as a woven or non-woven mesh, a mat or sheet. Preferably, the reinforcing material is provided as a tightly woven fabric mesh comprising woven synthetic fibers. Fiberglass or polypropylene fibers are preferred.

As noted above, the performance coating 18 includes a matrix which comprises a mixture by weight percent of from about 10% to about 70% of the aggregate 20, form about 5% to about 30% of the binder 22 and from about 5% to about 80% of a filler. In certain matrix formulations, from 0% to about 25% water may be required as a solvent.

In addition, the matrix may also include from 0% to about 5% of processing aids, modifiers and compounds which provide the sheathing material with specific aesthetic and/or functional characteristics. The processing aids and modifiers typically employed are well-known to those skilled in the art and include, for example, plasticizers, anti-fungicides, thickening agents, flowability agents and the like. Depending on the whether the performance coating itself provides the sheathing material with specified aesthetic and/or functional characteristics, the matrix may also include, for example, pigments, waterproofing agents and compounds which provide the sheathing with chemical resistance.

The aggregate 20 may be any suitable particulate material including, for example, silica sand, quartz sand, cracked limestone, glass, silicon carbide or hard plastic granules or bits, metal flakes or bits, perlite and recycled concrete. The aggregate 22 provides the sheathing with a textured finish, and the size and quantity of the aggregate granules incorporated into the matrix is selected according to the particular texture required. Typically, the granule size ranges from about 0.5 mm to about 10 mm.

The binder 22 may be any resinous binder having sufficient flexibility when cured to permit the sheathing material to be rolled or folded with out disrupting the integrity of the matrix, i.e., without cracking or crumbling. Preferably, an acrylic resin is used as the binder.

A matrix formulated according to the invention is set forth in Example I wherein the amount of each ingredient is specified by weight % of the total matrix formulation:

EXAMPLE I

| | |
|---|---|
| water | 6.1% |
| calcium carbonate (filler) | 5.3% |
| wollastonite (filler) | 3.4% |
| acrylic binder (UCAR 123, Union Carbide Co., Inc.) | 17.4% |
| sand | 62.8% |
| processing aids and modifiers | 5.0% |

The performance coating 18 may be further processed to present a more intricate finish beyond the texture provided by the aggregate. Virtually any pattern, design or graphic can be formed in the coating including, for example, simulated brick or stone finishes, logos, trademarks and company names. Typically, the performance coating 18 is metered onto the reinforcing layer 12, screeded to a uniform thickness and then processed to present the desired finish. In the case of a brick-like finish, for example, a mask is applied to the performance coating before the resin binder has cured to impart the brick pattern.

In the illustrated embodiment, the sheathing includes an elastomeric layer 26 applied to the exposed surface 24 of the performance coating to provide the sheathing with color and waterproofing. The layer 26 is mechanically applied by, for example, spraying, brushing or rolling. Of course, layer 26 is not limited to an elastomeric composition but is formulated based on the particular aesthetic and/or functional characteristics it is meant to provide.

As noted previously, a separate layer such as the layer 26 is not required. In many cases appropriate compounds may be added directly to the matrix to provide the sheathing with additional aesthetic qualities such as color, as well as specified functional characteristics such as waterproofing and chemical resistance.

To attach the sheathing 10 to a substrate, a layer of adhesive is applied to the inner surface 14 of reinforcing layer 12. Accordingly, the sheathing material is adhered in a one-step procedure by simply placing the self-adhering sheathing against the substrate. Any suitable tacky or non-tacky adhesive system well-known to those skilled in the art may be employed for this purpose. Alternatively, the adhesive may be applied directly to the substrate and the sheathing 10 subsequently attached thereto.

While preferred embodiments have been shown and described, various modifications and substitutions may be made without departing from the spirit and scope of the invention. Accordingly, it is to be understood that the present invention has been described by way of example and not by limitation.

I claim:

1. A pre-manufactured, flexible, composite sheathing material comprising:

a layer of flexible reinforcing material, said reinforcing layer having an inner surface and a support surface, and a performance coating applied to the support surface of the reinforcing layer, said performance coating defining an exposed surface and including a flexible matrix comprising a mixture of from about 10% to about 70% of an aggregate, from about 5% to about 80% of a filler and from about 5% to about 30% of a binder, said binder being sufficiently flexible to allow rolling and folding of the sheathing material without cracking or crumbling of the matrix.

2. The sheathing material of claim 1 further comprising an exterior layer applied to the exposed surface of the performance coating, said exterior layer including compounds which provide the sheathing with selected aesthetic and/or functional characteristics, said compounds selected from the group consisting of waterproofing agents, color pigments, agents imparting chemical resistance to the sheathing and mixtures thereof.

3. The sheathing material of claim 1 further comprising a coating of adhesive applied to the inner surface of the reinforcing layer for adhering said sheathing to a substrate.

4. The sheathing material of claim 1 wherein the reinforcing layer is selected from the group consisting of a woven and non-woven mesh.

5. The sheathing material of claim 4 wherein the mesh comprises a reinforcing material selected from the group consisting of fiberglass and synthetic fibers.

6. The sheathing material of claim 5 wherein the synthetic fibers are polypropylene fibers.

7. The sheathing material of claim 1 wherein the matrix further comprises compounds which provide the sheathing with selected aesthetic and/or functional characteristics, said compounds selected from the group consisting of waterproofing agents, color pigments, agents imparting chemical resistance to the sheathing and mixtures thereof.

8. The sheathing material of claim 1 wherein the binder comprises a resin having sufficient flexibility when cured to permit the sheathing to be folded or rolled without damage.

9. The sheathing material of claim 8 wherein the resin is an acrylic resin.

* * * * *